US011081925B2

(12) United States Patent
Smith et al.

(10) Patent No.: US 11,081,925 B2
(45) Date of Patent: *Aug. 3, 2021

(54) STATOR ASSEMBLY FOR A BRUSHLESS MOTOR IN A POWER TOOL

(71) Applicant: Black & Decker Inc., New Britain, CT (US)

(72) Inventors: David J. Smith, Columbia, MD (US); Justin H. Ayers, Jarrettsville, MD (US); David E. Gillespie, Baltimore, MD (US); Eric E. Hatfield, Anthem, AZ (US); Earl M. Ortt, Towson, MD (US); Stephen P. Osborne, Glen Arm, MD (US); Brian E. Friedman, Baltimore, MD (US); Jarrett A. Dunston, Bel Air, MD (US)

(73) Assignee: Black & Decker Inc., New Britain, CT (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/689,269

(22) Filed: Nov. 20, 2019

(65) Prior Publication Data

US 2020/0091793 A1 Mar. 19, 2020

Related U.S. Application Data

(63) Continuation of application No. 15/783,435, filed on Oct. 13, 2017, now Pat. No. 10,523,080, which is a (Continued)

(51) Int. Cl.
*H02K 3/52* (2006.01)
*H02K 7/14* (2006.01)

(52) U.S. Cl.
CPC ............. *H02K 3/521* (2013.01); *H02K 3/522* (2013.01); *H02K 7/145* (2013.01); *H02K 2203/06* (2013.01)

(58) Field of Classification Search
CPC ........ H02K 3/521; H02K 3/522; H02K 7/145; H02K 2203/06
(Continued)

(56) References Cited

U.S. PATENT DOCUMENTS 5,095,239 A * 3/1992 Wang .................... H02K 11/028
310/220
5,717,270 A * 2/1998 Lau ....................... H02K 11/028
310/220
(Continued)

*Primary Examiner* — John K Kim
(74) *Attorney, Agent, or Firm* — Amir R. Rohani

(57) ABSTRACT

A stator assembly for a brushless DC motor includes a stator core defining poles and having an outer surface, at least one magnet wire wound on the poles forming phases, and a bus bar including a non-conductive mount arranged on the outer surface and conductive terminals. Each conductive terminal includes: a main portion mounted on the non-conductive mount substantially parallel to the longitudinal axis of the motor, a tang portion folded over the main portion from a first longitudinal end of the main portion, and a connection tab at a second longitudinal end of the main portion. At least a contact portion of the at least one magnet wire is wrapped around the tang portion and fused to make an electric connection to the conductive terminal, and the connection tab is arranged to makes electric contact with a wire supplying electric power to the motor.

20 Claims, 18 Drawing Sheets

Related U.S. Application Data continuation of application No. 13/919,352, filed on Jun. 17, 2013, now Pat. No. 9,819,241, which is a continuation-in-part of application No. 13/704,033, filed as application No. PCT/US2011/040306 on Jun. 14, 2011, now Pat. No. 10,056,806.

(60) Provisional application No. 61/660,335, filed on Jun. 15, 2012, provisional application No. 61/354,543, filed on Jun. 14, 2010, provisional application No. 61/354,537, filed on Jun. 14, 2010.

(58) Field of Classification Search
USPC .......................................................... 310/50
See application file for complete search history.

(56) References Cited

U.S. PATENT DOCUMENTS

| | | | | |
|---|---|---|---|---|
| 5,895,990 | A * | 4/1999 | Lau | H02K 11/028 |
| | | | | 310/220 |
| 9,819,241 | B2 * | 11/2017 | Smith | H02K 7/145 |
| 10,523,080 | B2 * | 12/2019 | Smith | H02K 3/521 |
| 2002/0185930 | A1 * | 12/2002 | Furuya | H01R 39/32 |
| | | | | 310/233 |
| 2009/0026859 | A1 * | 1/2009 | Kinoshita | H02K 29/08 |
| | | | | 310/71 |
| 2018/0041088 | A1 * | 2/2018 | Smith | H02K 3/522 |
| 2020/0091793 | A1 * | 3/2020 | Smith | H02K 3/522 |

* cited by examiner

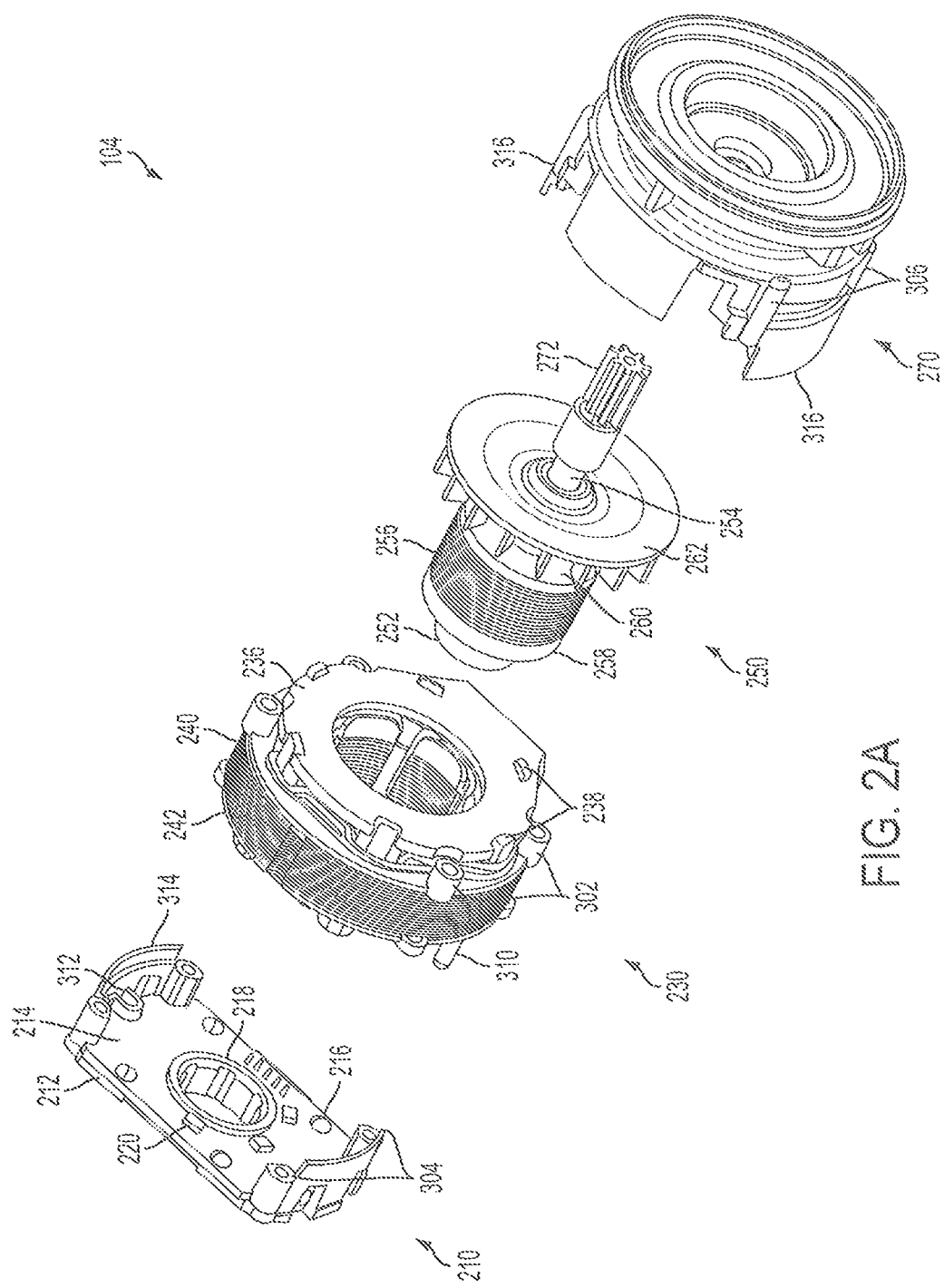

STATOR ASSEMBLY FOR A BRUSHLESS MOTOR IN A POWER TOOL

CROSS-REFERENCE TO RELATED APPLICATIONS

This application is a continuation of U.S. application Ser. No. 15/783,435, filed Oct. 13, 2017, which is a continuation of U.S. application Ser. No. 13/919,352, filed on Jun. 17, 2013, which claims the benefit of prior filed U.S. Provisional Application No. 61/660,335, filed Jun. 15, 2012, and is a continuation-in-part (CIP) of U.S. patent application Ser. No. 13/704,033 filed Dec. 13, 2012, which is a 35 USC 371 U.S. Nation Stage of PCT Application No. PCT/US2011/040306 filed Jun. 14, 2011, which claims the benefit of U.S. Provisional Application Nos. 61/354,537, filed Jun. 14, 2010, and U.S. Provisional Application No. 61/354,543, filed Jun. 14, 2010. Contents of all said applications are incorporated herein by reference in their entireties.

FIELD OF THE INVENTION

This disclosure relates to a power tool, and more particularly to a stator assembly for an electric brushless DC motor for a power tool and the control therefore.

BACKGROUND

The use of cordless power tools has increased dramatically in recent years. Cordless power tools provide the ease of a power assisted tool with the convenience of cordless operation. Conventionally, cordless tools have been driven by Permanent Magnet (PM) brushed motors that receive DC power from a battery assembly or converted AC power. The motor associated with a cordless tool has a direct impact on many of the operating characteristics of the tool, such as output torque, time duration of operation between charges and durability of the tool. The torque output relates to the capability of the power tool to operate under greater loads without stalling. The time duration of the power tool operation is strongly affected by the energy efficiency of the motor. Since, during some operating modes cordless tools are powered by battery modules that contain a limited amount of energy, the greater the energy efficiency of the motor, the longer the time duration that the tool can be operated. The durability of a power tool is affected by many factors, including the type of motor that is used to convert electrical power into mechanical power.

Brushed motors such as the PM brushed motors that are generally employed in power tool applications are susceptible to damaged brushes over time. The main mechanical characteristic that separates Permanent Magnet brushless motors from Permanent Magnet brushed motors is the method of commutation. In a PM brushed motor, commutation is achieved mechanically via a commutator and a brush system. Whereas, in a brushless DC motor, commutation is achieved electronically by controlling the flow of current to the stator windings. A brushless DC motor includes a rotor for providing rotational energy and a stator for supplying a magnetic field that drives the rotor. Comprising the rotor is a shaft supported by a bearing set on each end and encircled by a permanent magnet (PM) that generates a magnetic field. The stator core includes field windings around the rotor. Power devices such as MOSFETs are connected in series with each winding to enable power to be selectively applied. When power is applied to a winding, the resulting current in the winding generates a magnetic field that couples to the rotor. The magnetic field associated with the PM in the rotor assembly attempts to align itself with the stator generated magnetic field resulting in rotational movement of the rotor. A control circuit sequentially activates the individual stator coils so that the PM attached to the rotor continuously chases the advancing magnetic field generated by the stator windings. A set of sense magnets coupled to the PMs in the rotor assembly are sensed by a sensor, such as a Hall Effect sensor, to identify the current position of the rotor assembly. Proper timing of the commutation sequence is maintained by monitoring sensors mounted on the rotor shaft or detecting magnetic field peaks or nulls associated with the PM.

A brushless motor provides many advantages over conventional brushed motors. Conventional brushed motors are substantially less durable than brushless motors because of the wear and tear associated with the brushes. Also, since commutation is handled via a microcontroller, mechanical failures associated with the commutation are minimized and fail conditions are better managed and handled. Furthermore, brushed motors are less efficient than brushless motors due to the friction and the heat associated with the brushes and the commutator. Brushless motors also have the potential to provide size advantages over brushed motors with similar output levels. Since there is no commutator and brush system present in a brushless motor, the length of the rotor may be reduced significantly. The challenge is to efficiently design the motor to similarly reduce the length of the stator assembly. The overall reduction is the length of the motor is particularly useful in compact handheld power tool applications.

SUMMARY

According to an embodiment of the invention, a power tool is provided. The power tool may be, for example, a drill or an impact driver, although other types of power tools may also be used. The power tool includes a housing and a motor, such as a brushless DC motor, housed inside the housing. The motor includes a stator assembly and a rotor pivotably arranged inside the stator.

According to an embodiment, the stator assembly includes a lamination stack defining a plurality of poles, field windings each arranged at at least two opposite poles and connected together around the stator assembly, and a bus bar longitudinally arranged along an outer surface of the lamination stack. In an embodiment, the bus bar includes conductive terminals electrically coupled to the field windings and a power source.

According to an embodiment, the stator assembly further includes an end insulator arranged at a longitudinal end of the lamination stack. The end insulator may include an extension portion extending longitudinally over an outer surface of the lamination stack and vertical walls extending from the extension portion, the vertical walls and the extension portion defining insulating channels for retention of the conductive terminals. Alternatively, the end insulator may include at least one retaining wall protruding longitudinally along the outer surface of the lamination stack to retain the bus bar. In an embodiment, the stator assembly further includes a second end insulator arranged at a second longitudinal end of the lamination stack, the two end insulators having retaining features that mate to retain the bus bar. In an embodiment, the end insulator includes routing features for routing the wires from the field coils to the bus bar.

According to an embodiment, the bus bar includes a non-conductive mount mounted over the outer surface of the lamination stack, the conductive terminals being mounted on the non-conductive mount.

According to an embodiment, each conductive terminal includes: a first planar portion arranged parallel to the outer surface of the lamination stack and including a first hook extending from a surface thereof arranged to receive a first wire coupled to the field windings; and a second planer portion arranged at an angle with respect to the first planer portion and including a second hook extending from a surface thereon arranged to receive a second wire coupled to the power source.

According to an embodiment, each conductive terminal includes a tang arranged at a first distal end of the conductive terminal arranged to receive a first wire coupled to the field windings; and a protruding tab arranged at an angle from a second distal end of the conductive terminal arranged to be connected to a second wire coupled to the power source. In an embodiment, the first wire is wrapped around the tang and fused, and the second wire is welded or soldered to the protruding tab.

According to an embodiment, the field windings are connected to each other and to the plurality of conductive terminals in at least one of a series wye, series delta, parallel wye, or parallel delta configurations.

According to an embodiment, field windings are formed from a single wire both ends of which terminate at one of the conductive terminals.

According to an embodiment of the invention, the stator assembly includes a lamination stack defining poles; field windings arranged at at least two opposite poles of said plurality of poles and connected together around the stator assembly; and conductive terminals longitudinally arranged along an outer surface of the lamination stack and electrically coupled to the plurality of field windings and a power source.

According to an embodiment, the stator assembly further includes an end insulator arranged at a longitudinal end of the lamination stack. The end insulator may include an extension portion extending longitudinally over an outer surface of the lamination stack and vertical walls extending from the extension portion, the vertical walls and the extension portion defining insulating channels for retention of the conductive terminals. In an embodiment, the end insulator includes retaining walls protruding longitudinally along the outer surface of the lamination stack to retain the conductive terminals. In an embodiment, the stator assembly includes a second end insulator arranged at a second longitudinal end of the lamination stack, the two end insulators having retaining features that mate to retain the conductive terminals.

According to an embodiment, the stator assembly includes a non-conductive mount mounted over the outer surface of the lamination stack, the conductive terminals being mounted on the non-conductive mount.

According to an embodiment, each conductive terminal includes: a first planar portion arranged parallel to the outer surface of the lamination stack and including a first hook extending from a surface thereof arranged to receive a first wire coupled to the field windings; and a second planer portion arranged at an angle with respect to the first planer portion and including a second hook extending from a surface thereon arranged to receive a second wire coupled to the power source.

According to an embodiment, each conductive terminal includes a tang arranged at a first distal end of the conductive terminal arranged to receive a first wire coupled to the field windings; and a protruding tab arranged at an angle from a second distal end of the conductive terminal arranged to be connected to a second wire coupled to the power source. The first wire may be wrapped around the tang and fused and the second wire welded or soldered to the tang.

According to an embodiment, the conductive terminals are distanced from one another and spread around a periphery of the stator lamination stack.

BRIEF DESCRIPTION OF THE DRAWINGS

The drawings described herein are for illustration purposes only and are not intended to limit the scope of this disclosure in any way:

FIGS. 2A and 2B depict perspectives expanded views of a brushless electric motor, according to an embodiment of this disclosure;

DESCRIPTION

Figure 1:
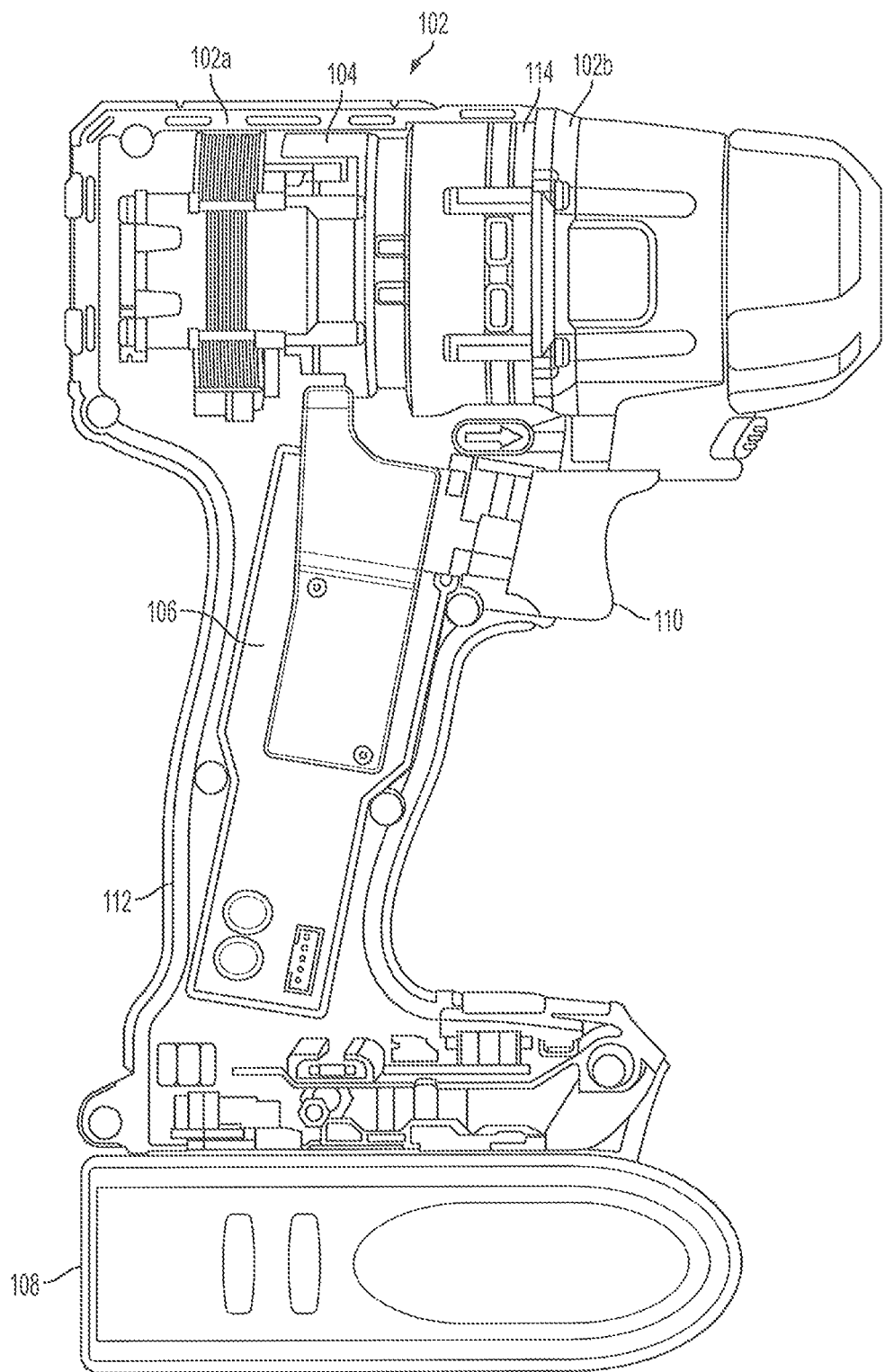
FIG. 1 depicts a perspective cross-sectional view of a power tool, according to an embodiment of this disclosure.

With reference to the FIG. 1, a power tool 100 constructed in accordance with the teachings of the present disclosure is illustrated in a longitudinal cross-section view. The power tool 100 in the particular example provided may be a drill/driver, but it will be appreciated that the teachings of this disclosure is merely exemplary and the power tool of this invention could be a circular saw, a reciprocating saw, or any similar portable power tool constructed in accordance with the teachings of this disclosure. Moreover, the output of the power tool driven (at least partly) by a transmission constructed in accordance with the teachings of this disclosure need not be in a rotary direction.

The power tool shown in FIG. 1 may include a housing assembly 102, a motor assembly 104, a control module 104, a battery pack 108, an input unit (e.g., a variable speed trigger) 110, a transmission assembly 114, an output spindle (not shown), and a chuck (not shown) that can be coupled for rotation with the output spindle. The housing assembly 102 can include a housing 102a and a gear case 102b that can be removably coupled to the housing 102a. The housing 102a can define a housing body and a handle 112.

According to an embodiment, the motor 104 is received in the housing 102a. The motor can be any type of motor and may be powered by an appropriate power source (electricity, pneumatic power, hydraulic power). In the particular example provided, the motor is a brushless DC electric motor and is powered by a battery pack 108. An input unit 110 is mounted in the handle 112 below the housing 102a. The input unit 110 may be a variable speed trigger switch, although other input means such as a touch-sensor, a capacitive-sensor, a speed dial, etc. may also be utilized. In an embodiment, variable speed trigger switch may integrate the ON/OFF, Forward/Reverse, and variable-speed functionalities into a single unit and provide respective inputs of these functions to the control unit 106. The control unit 106, which is coupled to the input unit 110 as described further below, supplies the drive signals to the motor. In the exemplary embodiment of the invention, the control unit 106 is provided in the handle 112.

The brushless motor 104 depicted in FIG. 1 is commutated electronically by the control unit 106. The tool 100 is powered by a suitable power source such as the battery pack 108. It is envisioned, however, that the present disclosures can be applied to a power tool with an AC power source, which may further include an AC-to-DC converter to power to motor. Using the variable-speed input and other inputs from the input unit 110, the control unit 106 controls the amount of power supplied to the motor 104. In an exemplary embodiment, the control unit 106 controls the Pulse Width Modulation (PWM) duty cycle of the DC power supplied to the motor 104.

Figure 2B:
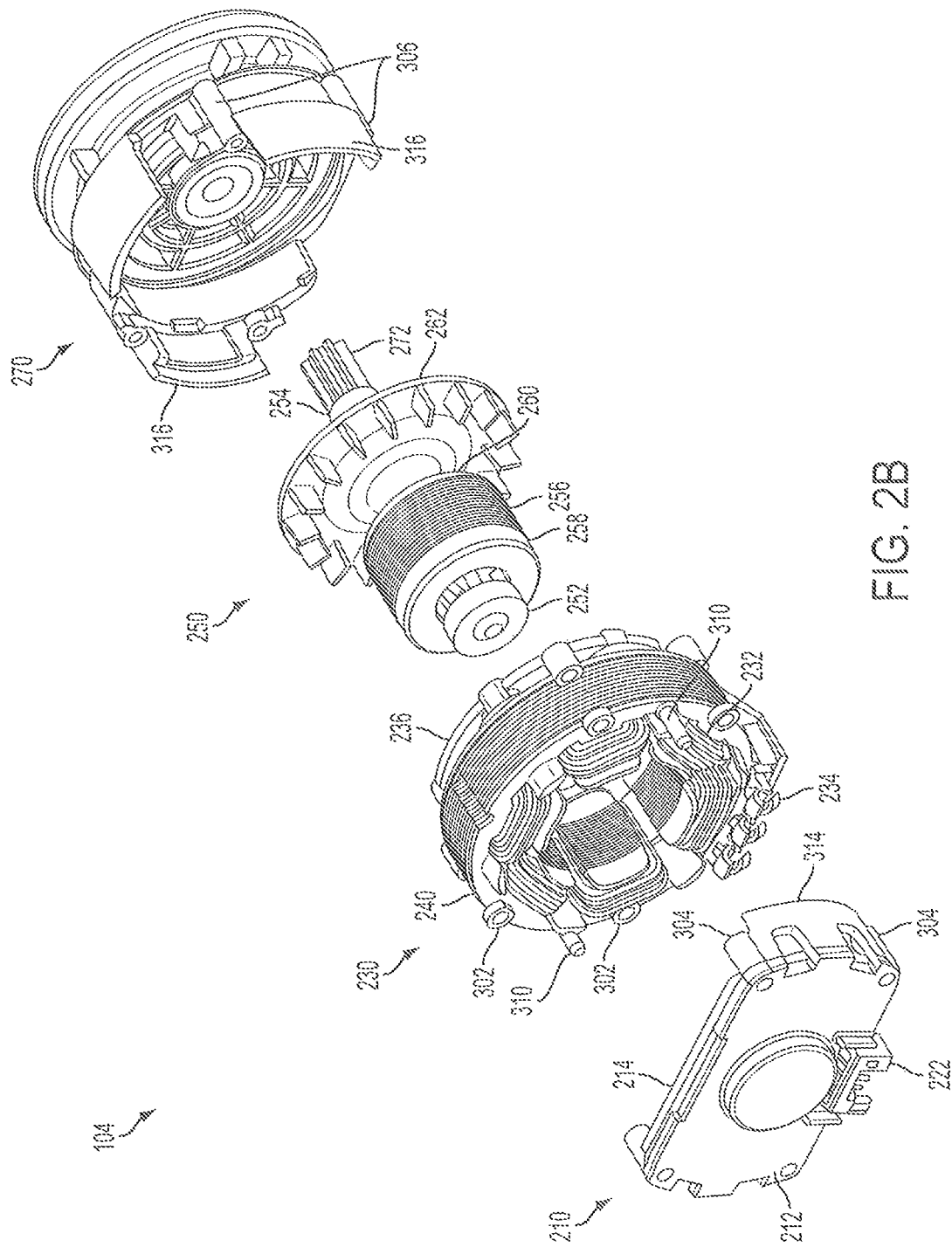
Figure 2C:
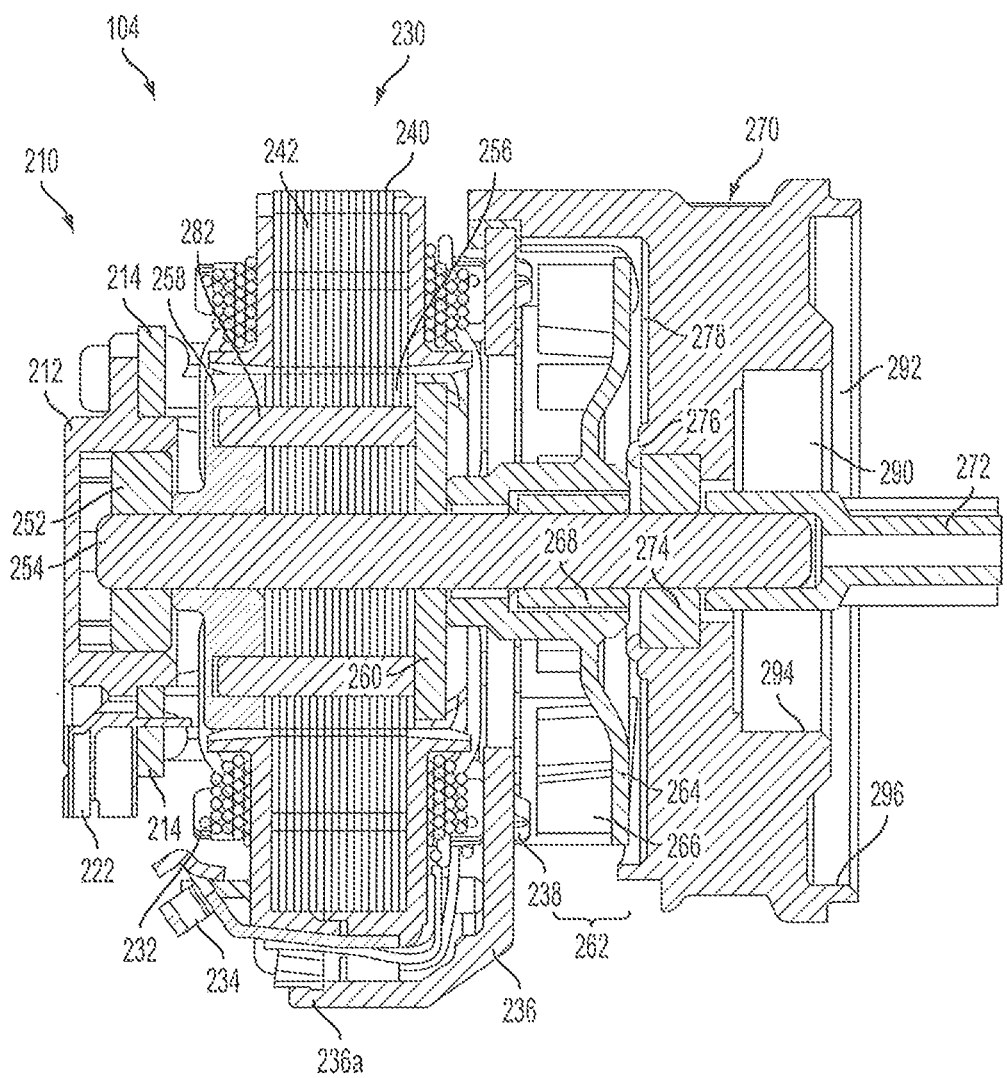
FIG. 2C depicts a perspective cross-sectional view of the brushless electric motor of FIGS. 2A and 2B, according to an embodiment of this disclosure.

Referring now to FIGS. 2A and 2B, perspectives expanded views of the brushless electric motor 104 is depicted according to an embodiment of the invention. FIG. 2C depicts a cross-sectional view of the brushless motor 104. As shown in these figures, in an exemplary embodiment, the brushless motor 104 includes Hall board mount assembly 210, a stator assembly 230, a rotor assembly 250, and a ring gear mount 270.

The Hall board assembly includes a Hall board mount 212 and a Hall board 214. The Hall board 214 snaps onto the Hall board mount 212 via a plurality of pins 216, which may then be welded over the Hall board 214. The Hall board mount 212 includes a bearing support 218 that receives an end bearing 252 of the rotor assembly 250. Mounted on the Hall board 214 are one or more Hall Effect sensors 220 arranged around the circumference of the bearing support 218. The Hall board mount 212 further includes a Hall Effect Sensor interference 222 that is coupled to the control unit 106 to provide the control unit 106 with Hall Effect sense signals.

The stator assembly 230 includes a stator 240 having a plurality of stator windings 232 housed in a stator lamination stack 242. In a six-pole three-phase brushless electric motor, as shown in this exemplary embodiment, three stator windings 232 are provided within the lamination stack 242. Each stator winding 232 is distributed around the lamination stack 242 to form an even number of poles. In a six-pole stator, each stator winding 232 includes a pair of windings arranged at opposite ends of the lamination stack 242 to face each other. The stator windings 232 may be connected in a variety of configurations. Exemplary configurations include a series delta configuration, a parallel delta configuration, a series wye configuration, and a parallel wye configuration. The distinguishing characteristics of these configurations will be discussed later in detail. The stator assembly 230 further includes a bus bar 234 coupled to the control unit 106 to receive DC power from the control unit 106 to power the field windings 232. Using the bus bar 234 and based on the input from the Hall Effect sensors 218, the control unit 106 sequentially commutates the stator windings 232 to drive the rotor 254. In addition, the stator assembly 230 includes a baffle 236 coupled to the stator 240 via snaps or pins 238. The baffle 235 may include a protrusion 236a at its low end to contain the wiring connections from the bus bar 234 to the stator windings 232. Alternatively, the baffle 235 may itself integrally include the bus bar 234 to input power from the control unit 106.

In an embodiment, the stator assembly 230 includes alignment features, i.e., pins 310 and receptacles 302, that mate with corresponding alignment features 304, 306 provided on the Hall board mount assembly 210 and ring gear mount 270.

Figure 3A:
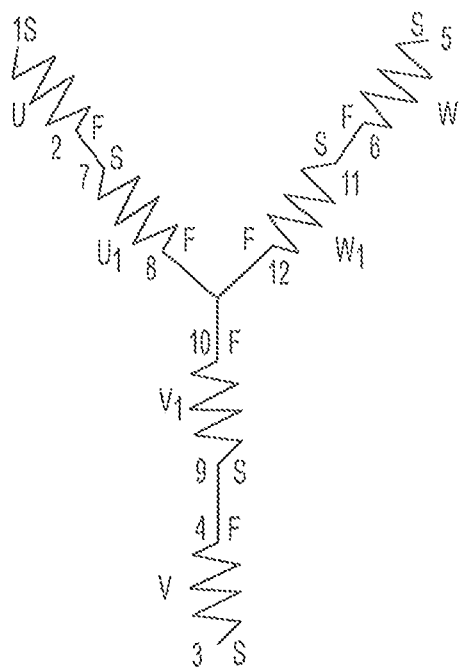
FIGS. 3A-3C depict various configurations for connecting stator windings of a brushless motor.
Figure 3B:
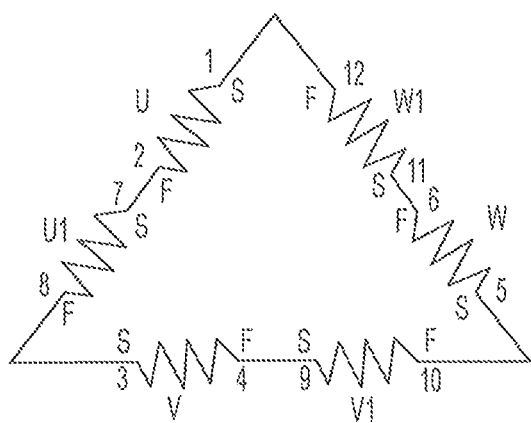
Figure 3C:
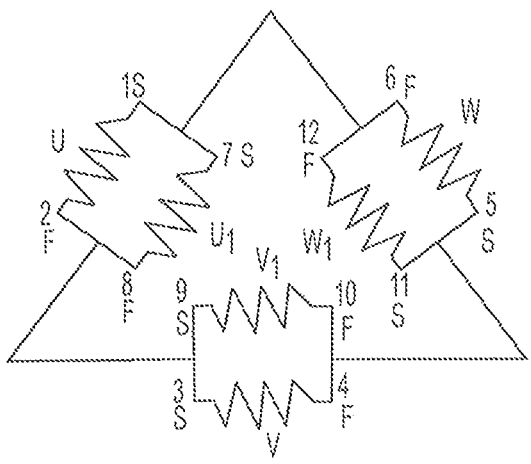
Figure 4:
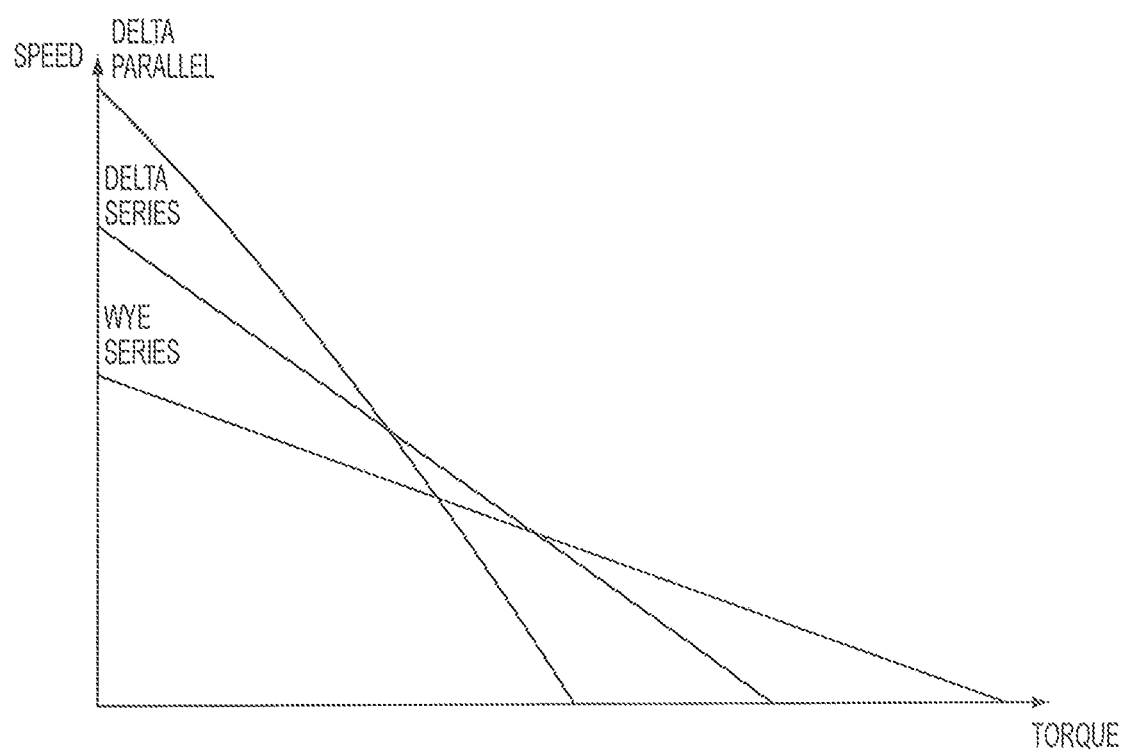
FIG. 4 depicts an exemplary speed-torque diagram of a brushless motor with different stator winding configurations.

FIGS. 3A-3C show different stator windings 232 connections used to achieve the series wye ("Y" shaped) (FIG. 3A), series delta (FIG. 3B), and parallel delta (FIG. 3C) configurations. A parallel wye configuration may also be achieved, although such configuration is not explicitly shown. The three stator windings in a six-pole brushless motor are typically designated as U-$U_1$; V-$V_1$; and W-$W_1$ windings, where each winding includes two poles (U and $U_1$, for example, designate two poles of the same winding). The wye configuration, sometimes called a star winding, connects all of the windings to a neutral (e.g., ground) point and power is applied to the remaining end of each winding. The delta configuration connects the three windings to each other in a triangle-like circuit, and power is applied at each of the connections. For a given motor, the delta configuration achieves higher speed (rpm) at lower torque, whereas the wye configuration achieves relatively higher torque at lower speed. The parallel delta configuration achieves the even higher speed at lower torque load. FIG. 4 depicts an exemplary speed-torque diagram of a brushless motor having these configurations.

In a typical off-the-shelf stator assembly for an electric brushless motor, the poles of each stator windings 232 (i.e., U and $U_1$, V and $V_1$, and W and $W_1$) are arranged opposite one another and are wound using a single wire during the manufacturing process. Specifically, the stator housing typically includes pre-routed wiring connections that connects terminals 2 (U) and 7 ($U_1$), terminal 4 (V) and 9 ($V_1$), and terminals 6 (W) and 11 ($W_1$) around or adjacent to the stator lamination stack 242 (See FIG. 5A). The remaining terminals may then be wired to achieve the desired configuration, i.e., delta or wye, in series or in parallel.

Figure 5A:
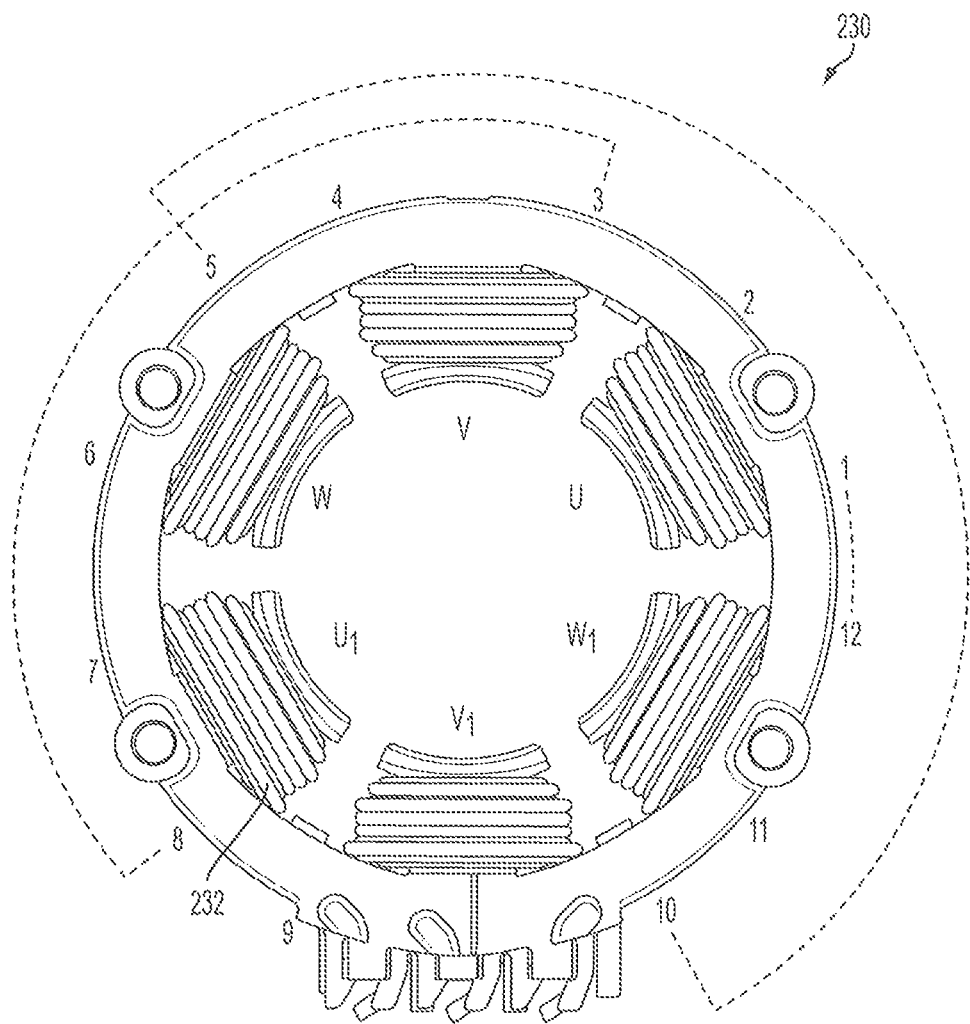
FIGS. 5A and 5B depict a motor stator connected to achieve a delta configuration, according to an embodiment of the invention.

Conventionally, in a six-pole motor, three adjacent poles are designated as U, V, and W, opposite the corresponding $U_1$, $V_1$, and $W_1$ poles of the same winding 232. FIG. 5A depicts the brushless motor 104 with this arrangement. A challenge with this arrangement, however, is that terminals 1 (U) and 12 ($W_1$), terminals 5 (W) and 10 ($V_1$) and terminals 3 (V) and 8 ($U_1$) must be wired together to obtain the delta configuration. It is easy to wire terminals 1 and 12 to each other, as they are located adjacent to one another. However, connecting terminals 5 and 10 and terminals 3 and 8 require wiring around the circumference of the stator 240. Furthermore, some conventional designs utilize a printed circuit board attached to the stator to facilitate the connections between the stator terminals, but the copper tracks of the printed circuit board are typically insufficient in handling large amounts of current in heavy duty power tool applications, such as drills or other high torque power tools.

Figure 5B:
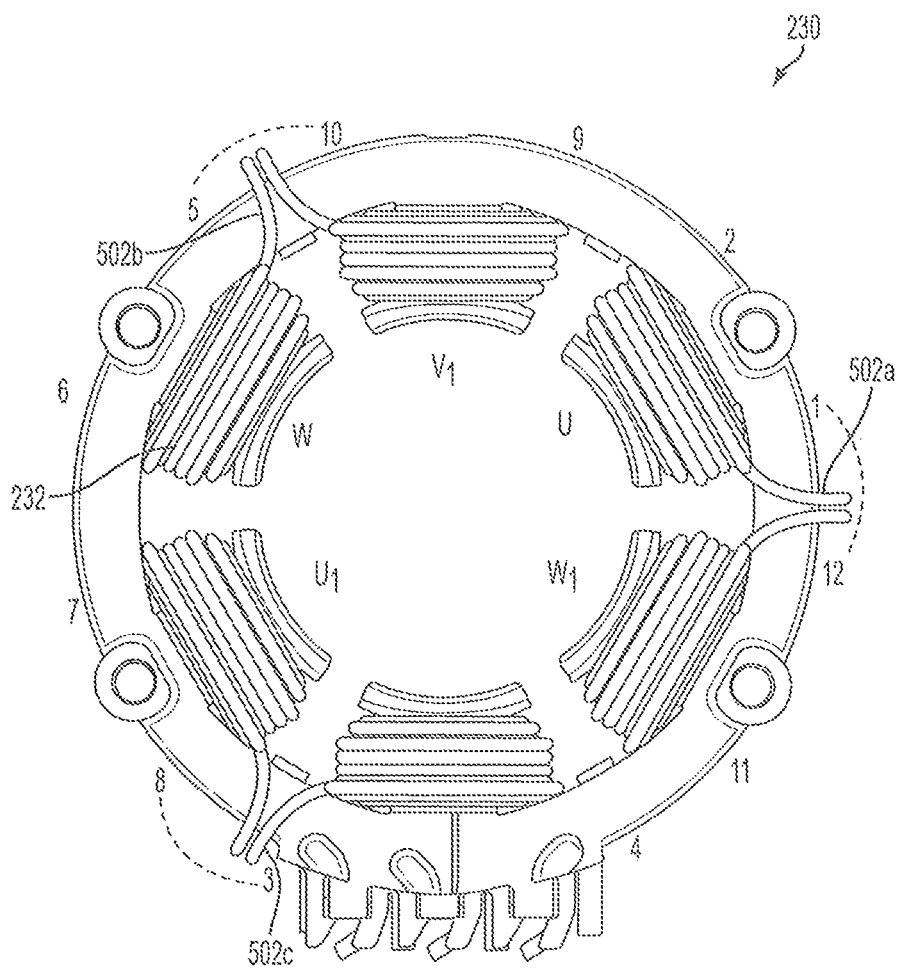

In order to overcome this challenge, according to an alternative embodiment of the invention shown in FIG. 5B, the poles of the stator windings are designated such that the terminals required for wiring a delta connection are arranged adjacent to one another. For example, in an exemplary embodiment, the designation of the stator windings poles V and $V_1$ are switched such that terminals 5 and 10 as well as terminals 3 and 8 fall adjacent to one another. Accordingly, the terminals can be connected easily without the need for extra wiring through the center or around the circumference of the stator 240. The stator windings 232 can be comprised of one continuous coil tapped at three connection points 502a, 502b, 502c for connecting the stator windings 232 to the bus bar 234. This arrangement significantly simplifies the motor winding process.

FIGS. 5C-5H depict the details of the bus bar 234 and the wiring of the stator assembly 230, according to an embodiment of the invention.

Figure 5C:
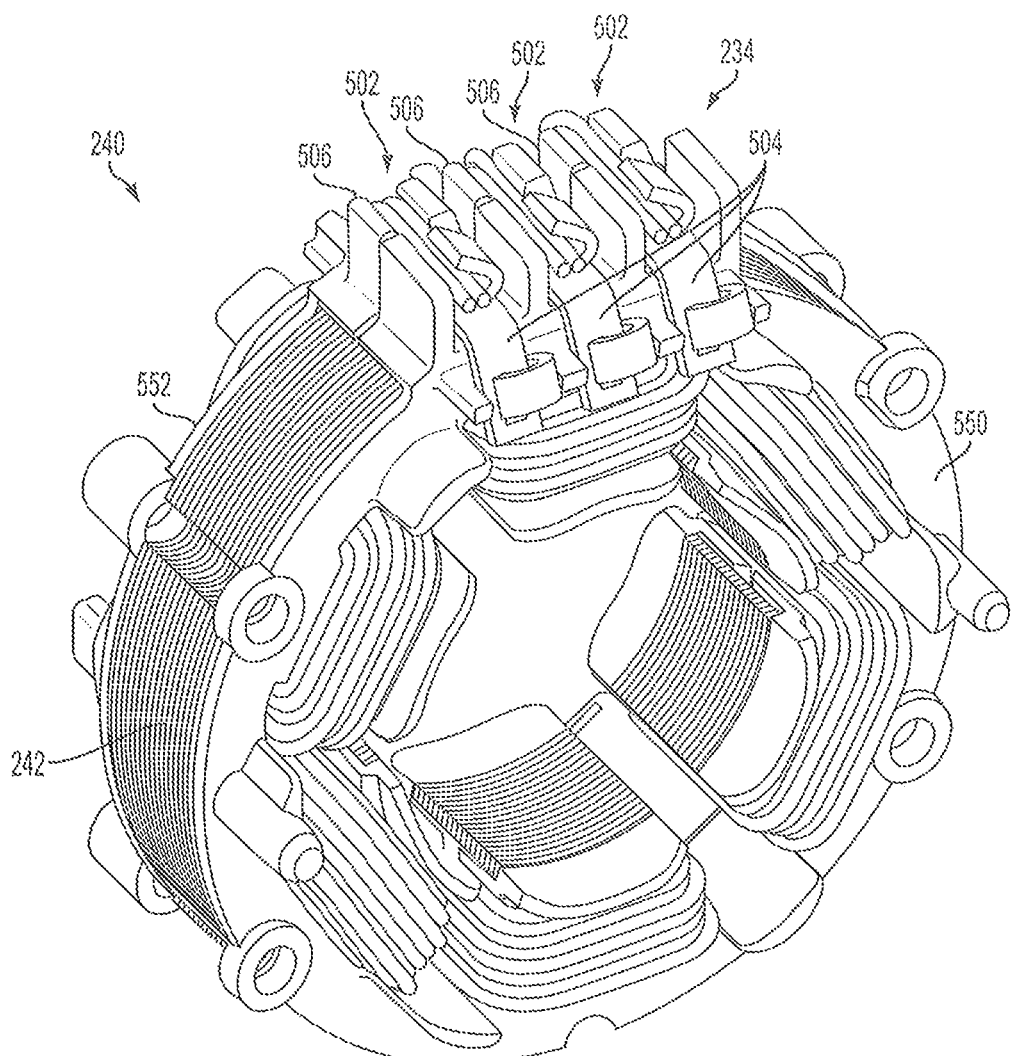
FIG. 5C depicts the bus bar connection of a stator assembly, according to an embodiment of the invention.
Figure 5D:
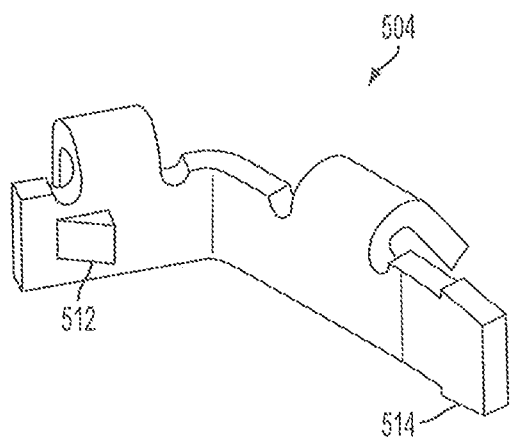
FIGS. 5D-5H depict conductive plates of the bus bar of FIG. 5C and wire connections thereto, according to an embodiment of the invention.
Figure 5E:
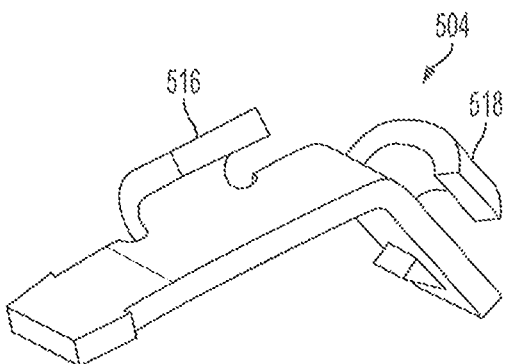

As shown in FIG. 5C, the stator 240 includes the lamination stack 242 and end insulators 550, 552. The bus bar 234 includes at least three input terminals 502 corresponding to each of the stator windings U, V and W. In an exemplary embodiment, the input terminals 502 comprise conductive plates 504 separated by insulating channels 506. The insulating channels 506, in an embodiment, are formed by a longitudinal extension portion extending over the outer surface of the lamination stack 242, and retaining walls extending vertically from the extension portion. The extension portions and the retaining walls are formed with the end insulators 550, 552 and are mated together over the outer surface of the lamination stack 242 to form the insulating channels 506. The bus bar 234 is arranged on an outer periphery of the stator lamination stack 242 and the conductive plates 502 are longitudinally arranged along the outer periphery of the stator lamination stack 242. The conductive plates 504 may be made of, for example, brass material or other conductive metal. As shown in FIG. 5D, each conductive plate 504 may include one or more barb features 512, 514 for attaching the conductive plates 504 inside the insulating channels 506. Further, as shown in FIGS. 5C and 5E, each conductive plate 504 may include a first planar portion arranged inside the insulating channels 506 and a second arranged at an angle from the first planar portion. The conductive plates include hooks 516 for routing wires from the stator windings to the conductive plates 504 extending from the first planar portions. The conductive plate 504 may also include hooks 518 for accommodating the wires from the control unit 106 to the conductive plates 504 extending from the second planar portions.

Figure 5F:
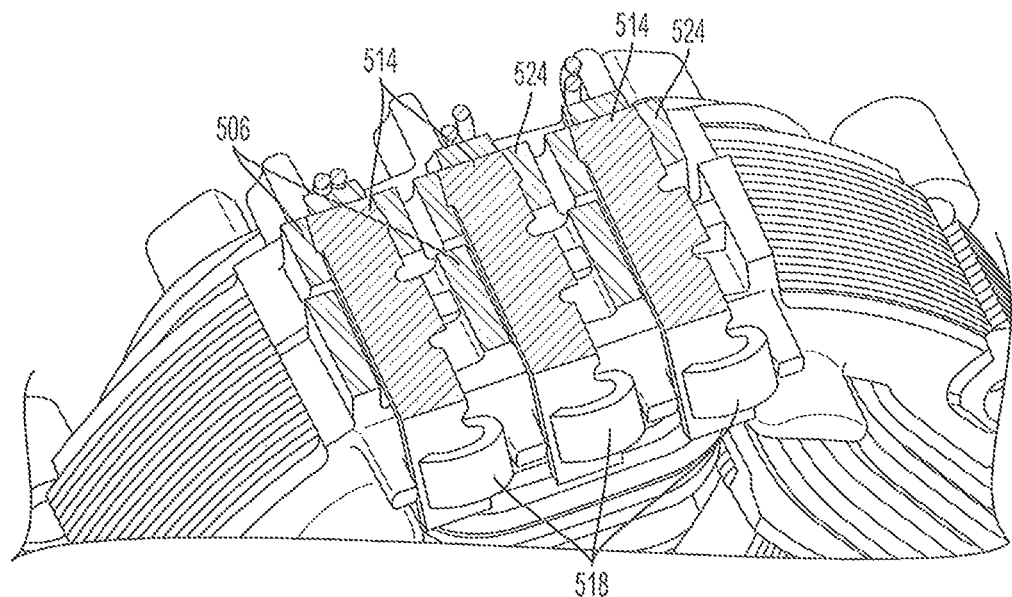
Figure 5G:
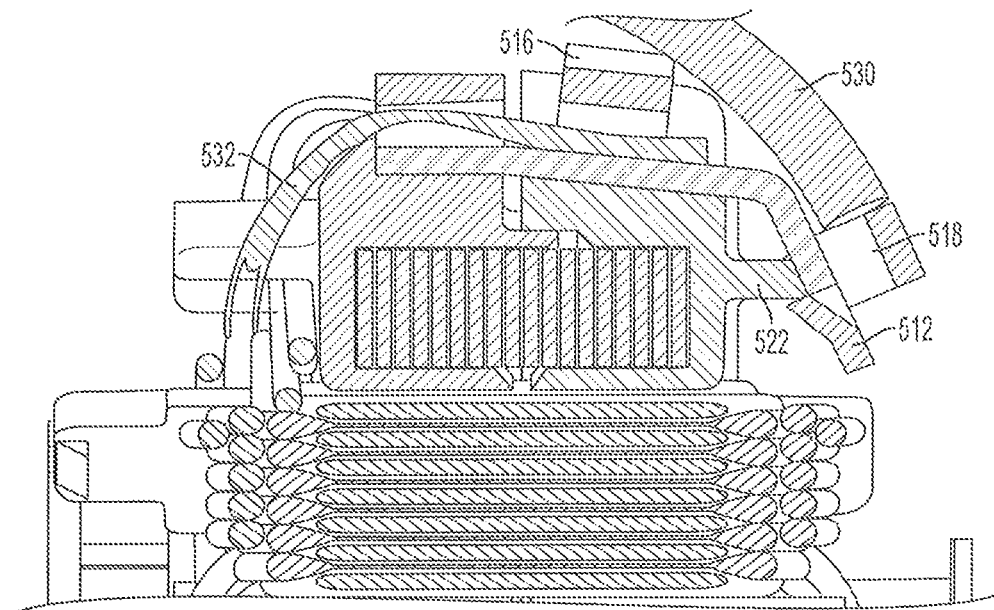
Figure 5H:
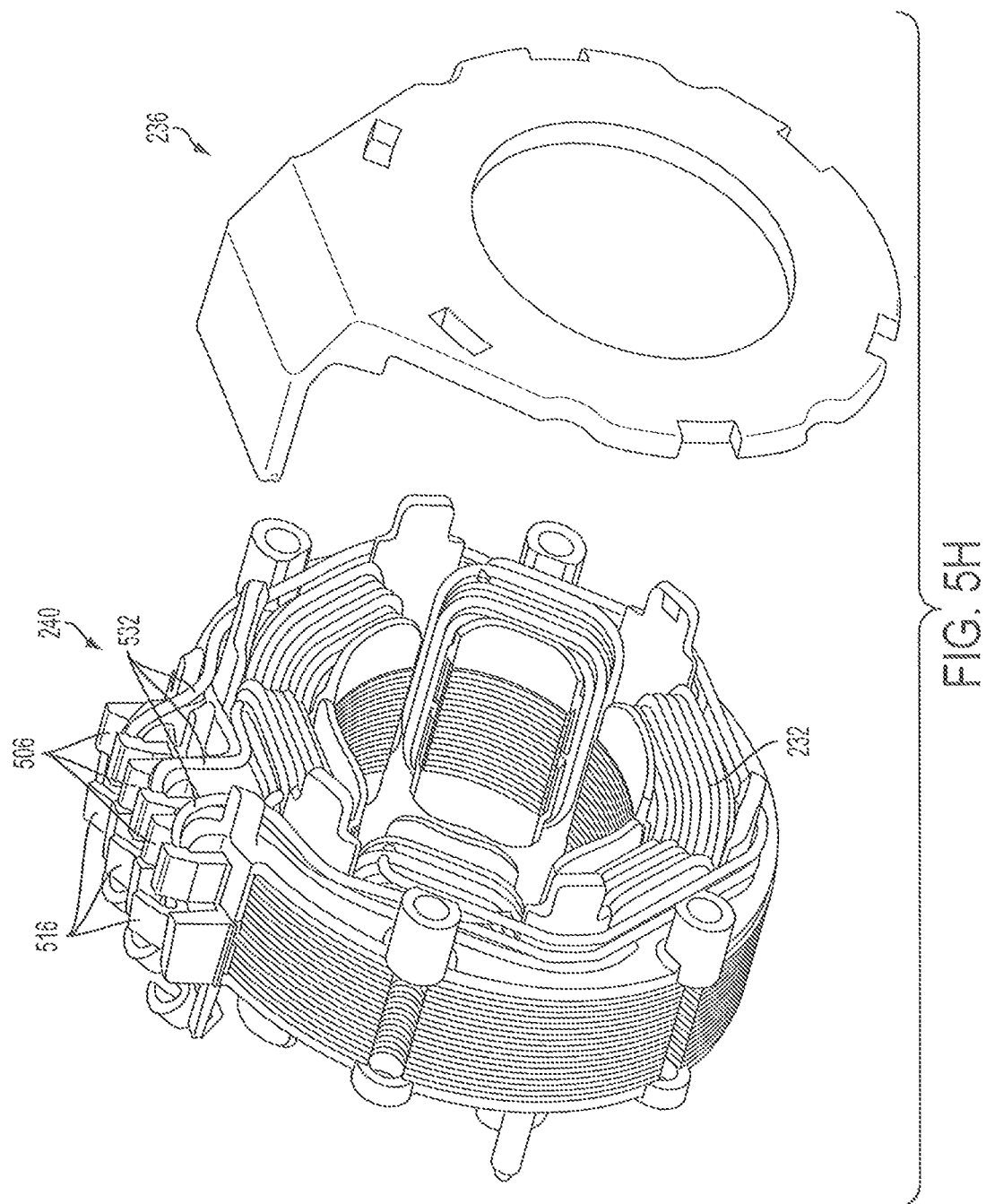

As shown in FIG. 5F, the barb features 514 of the conductive plates 504 snap into corresponding receiving slots 524 inside the insulating channels 506. The insulating channels 506 are shown in this figure without the walls separating the channels 506. Further, as shown in cross-sectional view of FIG. 5G, the barb features 512 engage protrusions 522 of the insulating channels 506 to lock the conductive plates 504 within the insulating channels 504. Wires 530 from the control unit 106 may be soldered or attached by other means inside the hooks 518. Similarly, wires 532 from the stator windings 232 may be soldered or otherwise attached inside the hooks 516. FIG. 5H depicts an expanded view of the stator assembly 230 including the wires 532 leading from the stator windings 232 and through the insulating channels 506 into the hooks 516.

The above-described embodiment of the bus bar 234 provides several advantages. First, since the terminals (i.e., conductive plates 504) are provided on the outer surface of the stator lamination stack, no additional space is taken up longitudinally. This reduces the overall length of the stator assembly. Also, the insulating channels that retain the terminals are molded as a part of the end insulators 550, 552, which significantly eases the manufacturing process.

In the above-discussed embodiment, during the course of motor manufacturing, the ends of the stator magnet wires are stripped of wire insulation and paired together. The pairs of leads are then received inside corresponding hooks 516 of conductive plates 504, and the hooks are crimped and soldered to the wire leads. The power inputs from the control unit and power source are similarly connected to the other corresponding hooks 518 of the conductive plates 504. While this arrangement may be desirable in some applications, the stripping and crimping steps may pose challenges during the motor manufacturing process.

Figure 6:
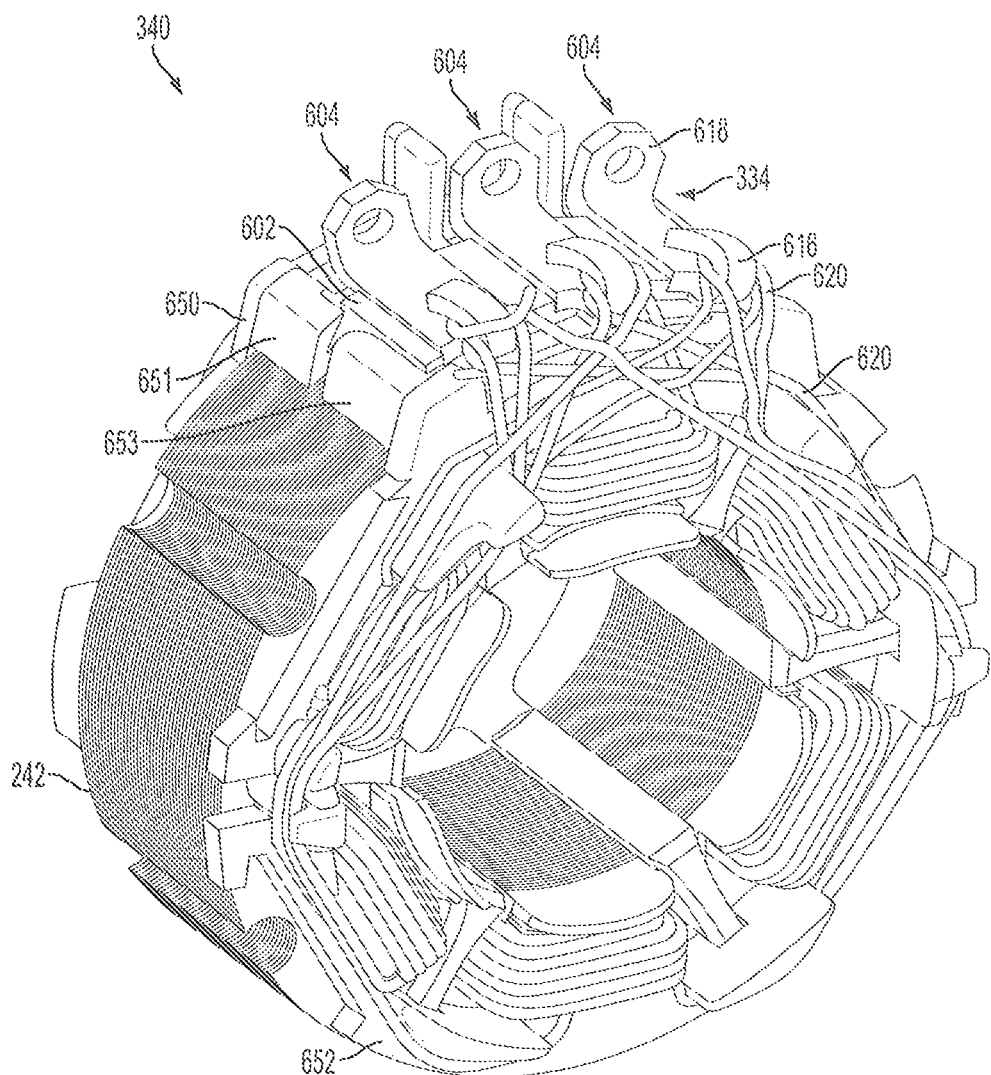
FIG. 6 depicts a perspective view of a bus bar of a stator assembly, according to an alternative embodiment.
Figure 7:
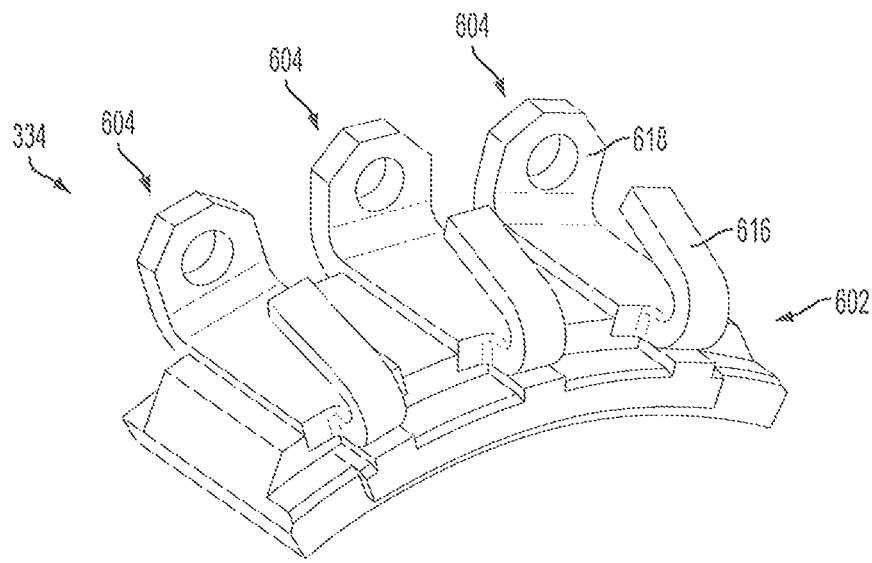
FIG. 7 depicts a perspective view of the bus bar of FIG. 6, according to an embodiment.
Figure 8:
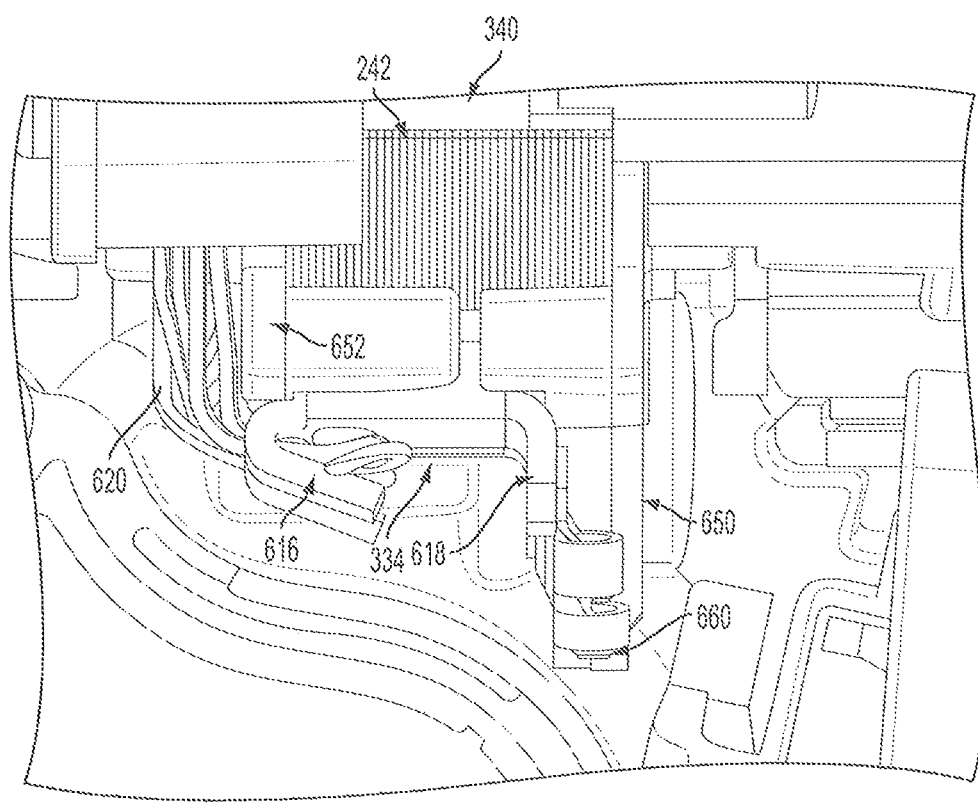
FIG. 8 depicts a partial cross-sectional view of a power tool and motor having the stator assembly of FIG. 6, according to an embodiment.

FIGS. 6-8 depict an alternative and improved bus bar 334, according to an alternative embodiment of the invention. FIG. 6 shows a stator assembly 340 including the bus bar 334, according to this embodiment. FIG. 7 shows a perspective view of the bus bar 334. FIG. 8 illustrates a cross-sectional view of the stator assembly 340 including the bus bar 334 inside a power tool housing.

In this embodiment, the bus bar 334 is arranged on an outer surface of the stator lamination stack 242. The bus bar 334 may extend fully or partially along the outer surface (i.e., outer periphery) of the stator lamination stack 242. The bus bar 334 includes three terminals (also referred to as conducive terminals or conductive plates) 604 arranged longitudinally along the outer surface of the lamination stack 242. In an embodiment, the conductive plates 604 are mounted on a non-conductive mount 602. The conductive plates 604 are separated and insulated from each other via the mount 602. The mount 602 is mounted on the outer surface of the lamination stack 242. The end insulators 650 and 652, which are arranged at the longitudinal ends of the lamination stack 242, are provided with retaining walls 651 and 653, respectively, which mate together over the outer surface of the lamination stack 242 around the mount 602 to retain the mount 602 over the outer surface of the lamination stack 242.

Conductive plates 604 in this embodiment include connection tabs 618 arranged at a first longitudinal distal end in the proximity of the end insulator 650, and tangs 616 arranged at a second longitudinal distal end in the proximity of the end insulator 652. The tangs 616 fold back over a main surface of the conductive plates 604 in the longitudinal direction of the conductive plates 604. The stator magnet wire 620, which is wound around the lamination stack slots to form stator coils, are routed over the end insulator 652 between the coils to connect the coils in wye or delta configurations. The end insulator 652 may be provided with routing features for routing and positioning the wire 620. In an embodiment, the magnet wire 620 may be wrapped around the tangs 616 at various points, e.g., either at the wire leads or at mid points, to facilitate the desired winding configuration. For example, for a delta connection (see FIG. 3B), the magnet wire 620 may be first wrapped around a first tang 616 at a lead end, routed and wound to form coils W and W₁, wrapped around a second tang 616, routed and wound to form coils U and U₁, wrapped round a third tang 616, routed and wound to form coils V and V₁, and terminated at the first tang 616. The fusing process burns a portion of the magnet wire insulation material that is in contact with the tangs 616. The fusing step thus eliminates the need for stripping the contact portion of the magnet wires. In an embodiment, the tangs 616 may be pressed over the magnet wire contact portion.

Connection tabs 618 project outwardly from the bus bar 334 and the stator lamination stack 242. Each tab 618 may include a through-hole therein. The motor wires (not shown) received from the control unit, which carry electric power to the motor field windings, may be inserted into the through-holes of the corresponding tabs 618 and soldered. Alternatively, the motor wires may be welded to the connection tabs 618. In yet another embodiment, additional terminals 660, as shown in FIG. 8, may be welded to the connection tabs 618.

The aforementioned embodiment offers several advantages. For example, the tang 616 geometry of the bus bar 334 may be designed to accommodate any amount of wire 620 leads and wire diameter. Also, the bus bar 334 may be designed to accommodate any lamination stack 242 length. The fusing of the stator magnet wires and attaching the motor wires also becomes easier using this embodiment. It must be noted that while the mount 602 is shown as a separate piece, the end insulators 650 and 652 may be provided with features to integrally form the mount 602. Also, the end insulators 650 and 652 may be provided with retaining features to support and retain the conductive plates 604 at various locations around the outer periphery of the stator assembly, e.g., at 120 degree angles.

Another aspect of this disclosure is discussed herein with continued reference to FIGS. 2A and 2B, and further in reference to FIGS. 9-12. It was found that many brushless motors platform, such as, for example, those using the stator assembly depicted in FIGS. 2A and 2B, develop a resonating frequency that is unpleasant to the end user when used in high-speed and/or high-power applications such as high speed power tools. The inventors of this application found that this noise is attributable to the stator laminations flexing and distorting at high speed. Specifically, as the rotor 250 rotates inside the stator assembly 230, the magnetic force of the rotor 250 magnets cause a small amount of vibration in the stator lamination poles. It was initially believed that the noise is generated by small movements of the individual laminations with respect to one another. However, it was found that reinforcing the laminations with respect to one another via adhesive or other means does not reduce the noise. The inventor then found that the lateral vibration of the poles and the pole teeth is primarily responsible for the noise. One solution is to increase the thickness of the lamination stack behind each pole. The reinforced metal behind each pole reduces the amount of unwanted vibration. However, increasing the thickness of the lamination stack increases the overall motor size, which is undesirable in many power tool applications.

Figure 9:
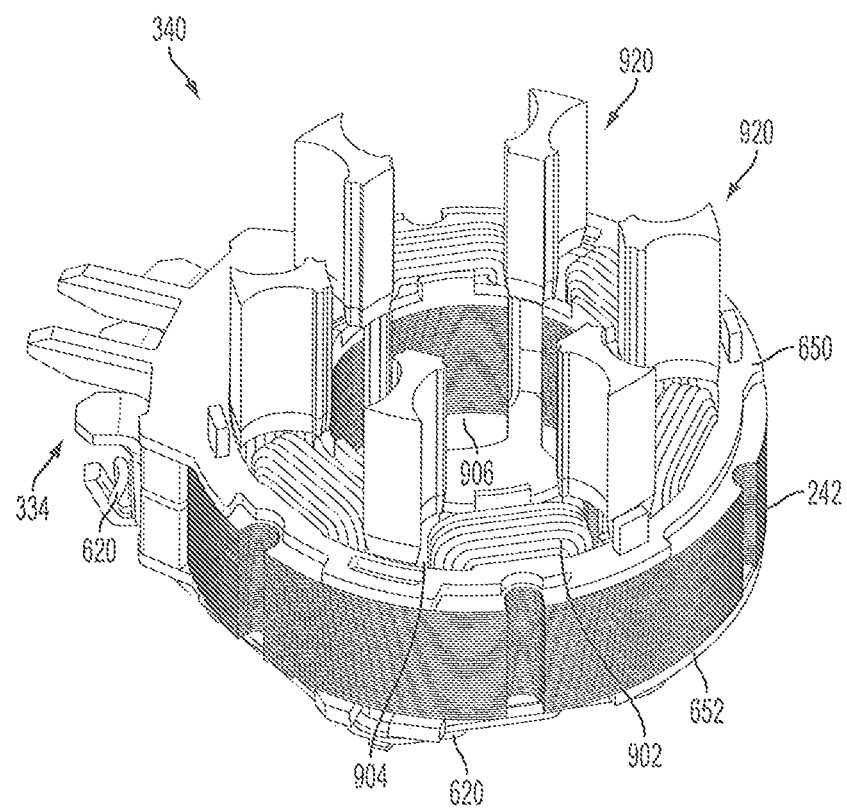
FIG. 9 depicts a perspective view of a stator assembly including tooth damper inserts, according to an embodiment.
Figure 10:
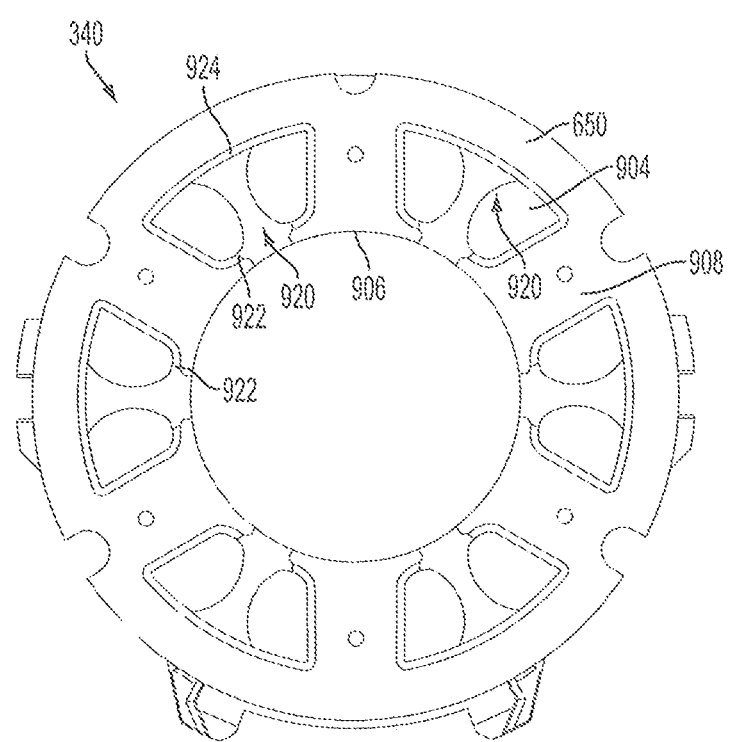
FIG. 10 depicts a cross-sectional view of the stator assembly with the tooth damper inserts inserted between the stator teeth, according to an embodiment.

In order to reduce the noise from the lamination stack poles and pole teeth, according to an embodiment on this disclosure, non-conductive tooth damper inserts may be provided inside the lamination stack slots to provide further support for the laminations teeth, as shown in FIGS. 9-13. In one embodiment, as shown in FIGS. 9 and 10, the tooth damper inserts 920 are provided within each slot 904 of the stator assembly 340 extending in a direction of the center of the stator assembly 340. FIG. 9 illustrates a perspective view of the stator assembly 340, with the tooth damper inserts 920 pulled out of the slots 904 for a better view. FIG. 10 illustrates a cross-sectional view of the stator assembly 340, with the tooth damper inserts 920 inserted in to the slots 904.

In an embodiment, each tooth damper insert 920 may include two radial end portions. A radial outer end 924 engages an outer wall of the slot 904 defined by an inner surface of the stator assembly 340, i.e., the inner surface of the lamination stack 242 and/or the slot wall portions of the end insulators 650 and 652 at the back of the slot 904. The radial outer end 924 may have an arcuate shape following a profile of the outer wall of the slot 904. The radial outer end 924 provides support for the laminations against radial movement and vibration.

In an embodiment, a radial inner end of the tooth damper insert 920 is arranged at an open end of the slot 904 formed between adjacent stator teeth 906 and engages lateral edges of the opposing teeth 906 that define the open end of the slot 904. In an embodiment, the second end portion includes two side projections (i.e., notches) 922 that engage back edges of the teeth 906. The second end portion of the tooth damper insert helps support the laminations teeth against rotational and/or radial movement and vibration. In an embodiment, the tooth damper inserts 920 are inserted into the slots 904 after the stator assembly 340 is fully wound. In an embodiment, the radial inner end of the tooth damper inserts 920 and the stator teeth 906 are aligned along a circle.

Figure 11:
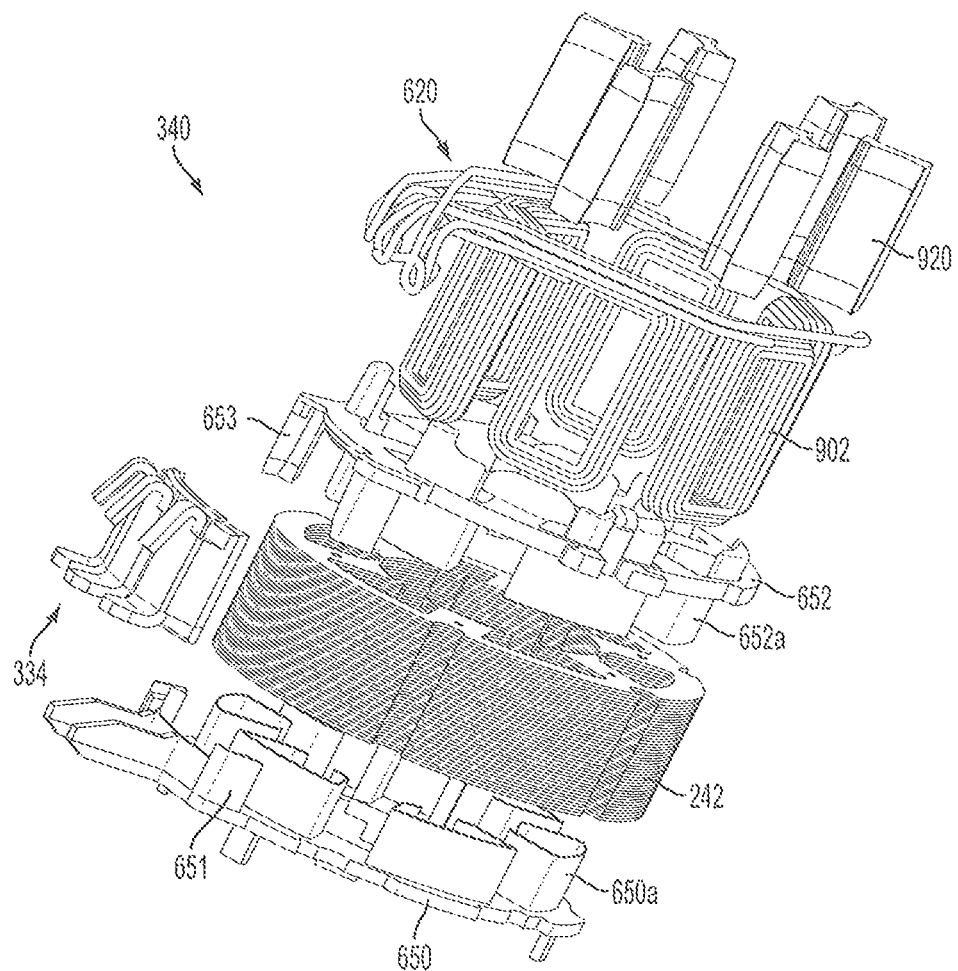
FIG. 11 depicts an expanded view of the stator assembly showing both the tooth damper inserts of FIG. 9 and the bus bar of FIG. 6.

FIG. 11 depicts an expanded view of the stator assembly 340, including the tooth damper inserts 920, stator field windings 902, magnet wires 620, stator lamination stack 242, end insulators 650 and 652, and the bus bar 334, according to an embodiment of the invention. The end insulators 650 and 652 are shown with walls 251 and 253 that mate together to securely hold the bus bar 334. The end insulators 650 and 652 are also shown with slot walls 650a and 652a that tightly penetrate into the slots of the lamination stack 242. The slot walls 650a and 652a support to the tooth damper inserts 920 inside the slots 904. In an embodiment, each of the slot walls 650a and 652a extends within the interior of the slot 604 from one tooth 906 to another. In an embodiment, the lateral edges of each slot wall 650a and 652a are positioned in the proximity of the inner edges of the teeth 906 so as to be in contact with (or close to) notches 922 of the tooth damper inserts 920. This allows the tooth damper inserts 920 notches 922 to engage the metallic edges of the teeth 906.

Figure 12:
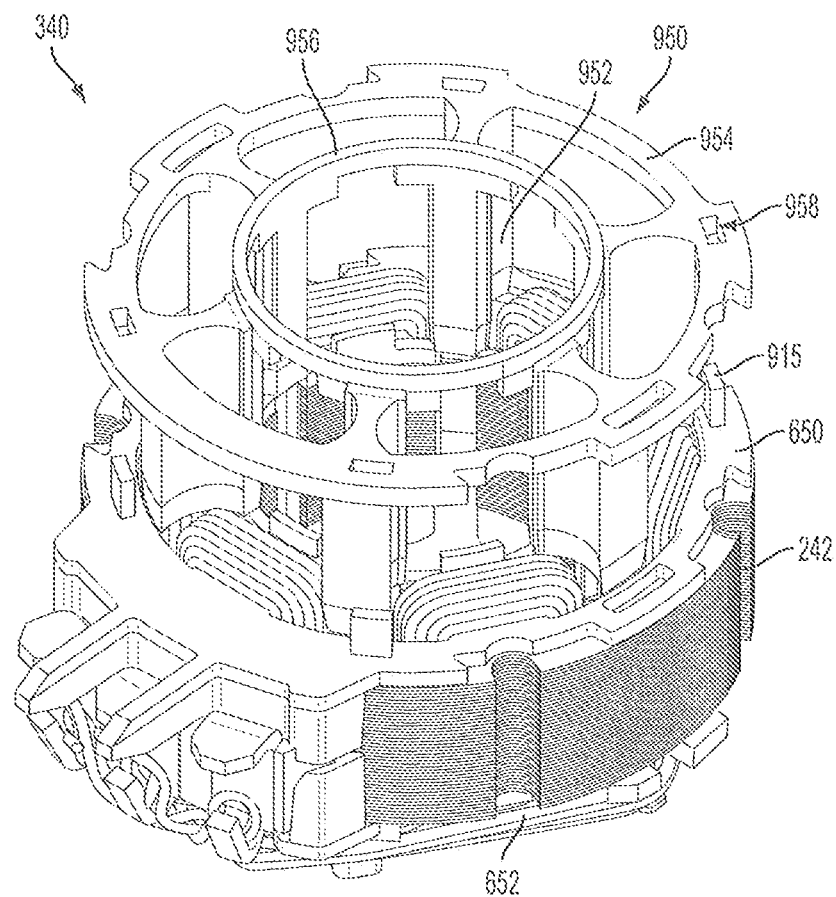
FIG. 12 depicts a perspective view of a stator assembly having a ring of tooth damper inserts, according to an alternative embodiment.
Figure 13:
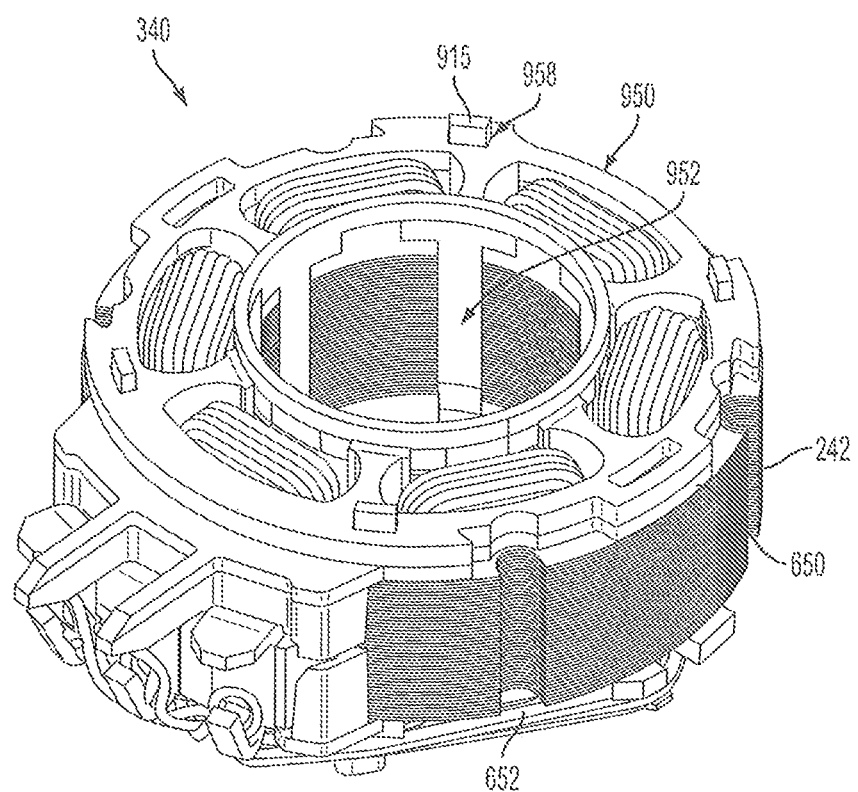
FIG. 13 depicts a perspective view of the stator assembly of FIG. 12 with the ring of tooth damper inserts being fully inserted, according to an embodiment.

FIGS. 12 and 13 depict teeth damper inserts pre-assembled into a ring 950, according to an embodiment. In this embodiment, the tooth damper inserts are pre-assembled into a ring 950 prior to insertion into the lamination stack slots. The ring 950 may include an outer ring 954 and an inner ring 956, with an upper surface of the tooth damper inserts extending from the outer ring 954 to the inner ring 952. The ring 950 includes through-holes corresponding to the stator coils 902 formed between the tooth damper inserts. The ring 950 may also include retention features 958 corresponding to snaps 915 provided on the end insulator 650. The ring 950 in this embodiment provides support for the tooth damper inserts. Additionally, the integrated ring 950 enables insertion of the tooth damper inserts in a single step, thus improving the assembly process.

The description of the invention is merely exemplary in nature and, thus, variations that do not depart from the gist of the invention are intended to be within the scope of the invention. Such variations are not to be regarded as a departure from the scope of the invention.

The invention claimed is:

1. A power tool comprising:
a housing;
a motor housed inside the housing, the motor having a stator assembly and a rotor rotatably arranged inside the stator, the stator assembly comprising:
a stator core defining a plurality of poles and having an outer surface that is substantially cylindrical formed around a longitudinal axis of the motor;
at least one magnet wire wound on the plurality of poles forming a plurality of phases in a delta or a wye configuration; and
a bus bar comprising: a non-conductive mount arranged on the outer surface of the lamination stack, and a plurality of conductive terminals arranged to receive electric power from a power source and supply electric power to the plurality of phases,
wherein each conductive terminal includes: a main portion mounted on the non-conductive mount substantially parallel to the longitudinal axis of the motor, a tang portion folded over the main portion from a first longitudinal end of the main portion, and a connection tab at a second longitudinal end of the main portion, wherein at least a contact portion of the at least one magnet wire is wrapped around the tang portion and fused to make an electric connection to the conductive terminal, and the connection tab is arranged to makes electric contact with a wire supplying electric power to the motor.

2. The power tool of claim 1, wherein the stator assembly further comprises an end insulator arranged at a longitudinal end of the lamination stack.

3. The power tool of claim 2, wherein the end insulator comprises an extension portion extending longitudinally over an outer surface of the lamination stack to retain the bus bar on the outer surface of the lamination stack.

4. The power tool of claim 2, wherein the end insulator comprises two retaining walls protruding longitudinally along the outer surface of the lamination stack on two sides of the bus bar to retain the bus bar on the outer surface of the lamination stack.

5. The power tool of claim 2, wherein the stator assembly further comprises a second end insulator arranged at a second longitudinal end of the lamination stack, the two end insulators having retaining features that mate to retain the bus bar on the outer surface of the lamination stack.

6. The power tool of claim 1, wherein the conductive terminals are arranged at close proximity to one another in parallel, and the non-conductive mount electrically isolates the plurality of conductive terminals.

7. The power tool of claim 1, wherein the connection tab protrudes at an angle from the second longitudinal end of the main portion.

8. The power tool of claim 1, wherein the wire supplying electric power to the motor is soldered to the connection tab.

9. The power tool of claim 1, wherein the tang portion is pressed over a portion of the contact portion of the at least one magnet wire.

10. The power tool of claim 1, wherein two ends of the at least one magnet wire terminate around the tang portion of one of the plurality of terminals.

11. A brushless direct-current (BLDC) motor having a stator assembly and a rotor rotatably arranged inside the stator, the stator assembly comprising:
a stator core defining a plurality of poles and having an outer surface that is substantially cylindrical formed around a longitudinal axis of the motor;
at least one magnet wire wound on the plurality of poles forming a plurality of phases in a delta or a wye configuration; and
a bus bar comprising: a non-conductive mount arranged on the outer surface of the lamination stack, and a plurality of conductive terminals arranged to receive electric power from a power source and supply electric power to the plurality of phases,
wherein each conductive terminal includes: a main portion mounted on the non-conductive mount substantially parallel to the longitudinal axis of the motor, a tang portion folded over the main portion from a first longitudinal end of the main portion, and a connection tab at a second longitudinal end of the main portion, wherein at least a contact portion of the at least one magnet wire is wrapped around the tang portion and fused to make an electric connection to the conductive terminal, and the connection tab is arranged to makes electric contact with a wire supplying electric power to the motor.

12. The BLDC motor of claim 11, wherein the stator assembly further comprises an end insulator arranged at a longitudinal end of the lamination stack.

13. The BLDC motor of claim 12, wherein the end insulator comprises an extension portion extending longitudinally over an outer surface of the lamination stack to retain the bus bar on the outer surface of the lamination stack.

14. The BLDC motor of claim 12, wherein the end insulator comprises two retaining walls protruding longitudinally along the outer surface of the lamination stack on two sides of the bus bar to retain the bus bar on the outer surface of the lamination stack.

15. The BLDC motor of claim 12, wherein the stator assembly further comprises a second end insulator arranged at a second longitudinal end of the lamination stack, the two end insulators having retaining features that mate to retain the bus bar on the outer surface of the lamination stack.

16. The BLDC motor of claim 12, wherein the conductive terminals are arranged at close proximity to one another in parallel, and the non-conductive mount electrically isolates the plurality of conductive terminals.

17. The BLDC motor of claim 11, wherein the connection tab protrudes at an angle from the second longitudinal end of the main portion.

18. The BLDC motor of claim 11, wherein the wire supplying electric power to the motor is soldered to the connection tab.

19. The BLDC motor of claim 11, wherein the tang portion is pressed over a portion of the contact portion of the at least one magnet wire.

20. The BLDC motor of claim 11, wherein two ends of the at least one magnet wire terminate at the tang portion of one of the plurality of terminals.

* * * * *